2,850,356

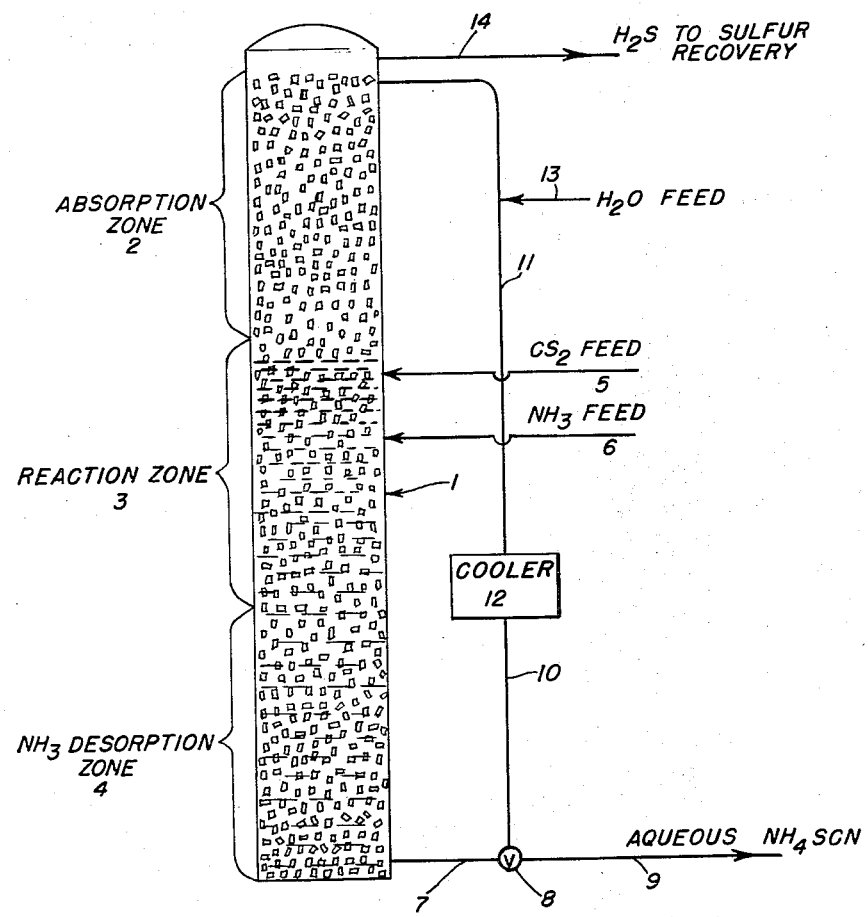

AMMONIUM THIOCYANATE MANUFACTURE

Hunt Sutherland, Springdale, and William D. Gersumky, Greenwich, Conn., assignors to American Cyanamid Company, New York, N. Y., a corporation of Maine Application July 23, 1956, Serial No. 599,370

6 Claims. (Cl. 23—75)

This invention relates to a novel preparation of ammonium thiocyanate. More particularly it relates to the preparation of ammonium thiocyanate by causing ammonia and carbon disulfide in an aqueous medium to react under substantially atmospheric pressure.

In the past, any process involving the reaction of ammonia and carbon disulfide in an aqueous medium to yield ammonium thiocyanate could be performed under moderately high superatmospheric pressures. Such pressures were in the range of from about 50 p. s. i. to 100 p. s. i. However, the use of such pressures was not wholly satisfactory for the reason that expensive pressure equipment was required. Also, special safety precautions had to be taken in utilizing pressure equipment.

It is, therefore, a principal object of the present invention to provide a process for conducting the reaction of ammonia and carbon disulfide in an aqueous medium at substantially atmospheric pressure. It is a further object of the invention to provide such a process in which the use of pressure equipment can be substantially eliminated.

These, and other objects, are attained in a surprisingly expeditious and simple manner. It has been found that ammonia and carbon disulfide can be advantageously reacted in an aqueous medium provided the latter contains sufficient ammonium thiocyanate. By this simple discovery, it has been found that it is unnecessary to employ superatmospheric pressures to obtain satisfactory yields of ammonium thiocyanate of good quality.

According to the present invention, at least two mols of ammonia and about one mol of carbon disulfide are reacted under substantially ambient conditions in the presence of an aqueous ammonium thiocyanate medium. In general, the latter contains from about 20% to about 50% of ammonium thiocyanate by weight. About 30% to about 40% is a good general practice. Once the medium is established, the carbon disulfide and ammonia are fed thereinto, either simultaneously or in separate streams. The reaction is carried out in a vessel suitably equipped with heating means. The vessel itself is so equipped that it can be heated in such manner as to provide a controlled temperature gradation.

The invention will be more readily understood from the following more detailed description of a preferred embodiment of the invention and from the accompanying drawing wherein:

The drawing is a schematic flow diagram for effecting reaction between carbon disulfide and ammonia at substantially atmospheric pressure. This flow diagram constitutes a preferred embodiment of the invention.

Referring to the drawing, 1 represents a reaction tower. It is filled with conventional packing, such as porous chips or Raschig rings. For simplicity of explanation, the tower is subdivided into three zones, all designated by brackets, namely an upper zone 2, an intermediate or central zone 3, and a lower zone 4. In the upper zone 2, an average temperature of about 35° C. is maintained, although a temperature range of from about 30° C. to about 40° C. is provided. This zone, otherwise termed the ammonia absorption zone, insures the removal of hydrogen sulfide as a gas and allows for ammonia absorption into an aqueous ammonium thiocyanate solution which is introduced into the topmost section of that zone. The latter solution also serves to establish the liquid medium of the central zone. The central or middle zone 3 is maintained at from above about 40° C. to below about 70° C. with an average temperature of about 55° C. Carbon disulfide and ammonia are introduced into this zone through lines 5 and 6 respectively. Reaction occurs in the liquid phase with the attendant ascent of gaseous hydrogen sulfide and gaseous unreacted ammonia. The latter ammonia is returned to the reaction zone, however, when it is liquefied in the ammonia absorption zone 2. In the lower zone 4, a temperature of from about 70° C. to about 95° C. with an average temperature of about 80° C. is provided. This zone substantially prevents any unreacted liquid ammonia from being withdrawn along with product ammonium thiocyanate. Ammonia in the latter product is evaporated into the middle zone 3 where it can be reacted with carbon disulfide.

For the size of the tower, the flows of incoming carbon disulfide and ammonia are so regulated as to insure reaction in the reaction zone. Additionally, aqueous ammonium thiocyanate is introduced into the upper zone 2 at a rate so as to permit it to maintain a liquid level within the reaction zone for good practice. However, the so-introduced ammonium thiocyanate may be introduced at a rate to fill the ammonia absorption zone either partially or substantially completely, although this latter procedure is not the best practice for effecting ammonia absorption in that zone.

Product ammonium thiocyanate is withdrawn through line 7. It is divided into two portions at valve 8. One portion is withdrawn at line 9 and another is recycled to the tower 1 through lines 10 and 11 respectively. However, prior to its entry into the tower, the returned ammonium thiocyanate is first passed through a heat exchanger 12 where it is cooled. The so-cooled ammonium thiocyanate is diluted before introduction into the upper zone, by admixing water therewith. The water is fed as shown through line 13. As indicated above, gaseous hydrogen sulfide is withdrawn from the upper zone 2 and is led through line 14 to a sulfur recovery plant.

The average temperature in each zone of the tower is maintained by techniques well known to the art. For example, by properly spacing heating and cooling coils (not shown) which envelop the tower, the desired temperature range can be easily obtained in each zone.

Although a reaction tower having packing has been described above, any mechanical equivalent thereof can be employed in the successful practice of the present invention. For example, a fractionating column of bubble-cap plate design is within our purview and contemplation.

In a typical run, the apparatus of the drawing is simply utilized by permitting separate streams of liquid carbon disulfide and liquid ammonia to be continuously fed into the reaction zone. So-introduced reactants may be in the gaseous form, if desired, although either gaseous or liquid reactants are added with advantage. A liquid level is maintained in the reaction zone which is maintained at an average temperature of about 55° C. During reaction, gaseous hydrogen sulfide and unreacted ammonia rise into the upper zone maintained at an average temperature of about 35° C. Gaseous hydrogen sulfide is exited, while gaseous ammonia is condensed and is returned to the reaction zone. In the meantime, a 3% aqueous ammonium thiocyanate which has been previously cooled to about the average temperature in the upper zone is introduced in the upper section of the zone and trickles or otherwise flows into the reaction zone. Product ammonium thiocyanate accumulates in the bottom zone and is continuously withdrawn. However, prior to its withdrawal, any accumulated ammonia is evaporated since the average temperature of the bottom zone is maintained at about 80° C. A 50% concentrated solution of product ammonium thiocyanate, substantially free from ammonia and of course hydrogen sulfide, is withdrawn from the bottom section of the bottom zone. A portion of the latter is cooled and diluted with water. So-diluted ammonium thiocyanate which provides the reaction menstruum is reintroduced into the uppermost portion of the tower.

Although the process of the present invention has been described with reference to the use of atmospheric pressure during reaction, it is an advantage of the present invention that in addition to the use of ammonium thiocyanate, a slight elevated pressure of from 5 to 10 p. s. i. g. can be employed. In such manner, ammonium thiocyanate produced will be swiftly eliminated from the system and recovered. It is also within the purview of the invention that the aforedescribed process may be caused to operate either batch-wise as well as continuously.

We claim:

1. A process for preparing ammonium thiocyanate which comprises the steps of: feeding at least two mols of ammonia and one mol of carbon disulfide into the central zone of a reactor maintained under ambient conditions and comprising an upper zone, central zone and lower zone; maintaining the central zone at a temperature of above about 40° C. and below about 70° C.; establishing in said central zone an aqueous medium containing of from about 20% to about 50% by weight of ammonium thiocyanate; withdrawing ammonium thiocyanate substantially free from ammonia from the lowermost portion of the bottom zone maintained at a temperature of from above about 70° C. and about 95° C.; diluting a portion of withdrawn ammonium thiocyanate with water; cooling the latter solution; recycling the cooled diluted ammonium thiocyanate to the uppermost portion of the upper zone maintained at a temperature of from about 30° C. to about 40° C.; and eliminating hydrogen sulfide from said zone.

2. A continuous process for preparing ammonium thiocyanate which comprises the steps of: providing a packed tower comprising an upper zone, a central zone and a lower zone, progressively heating each zone while maintaining an average temperature of about (a) 35° C. in the upper zone of said tower, (b) about 55° C. in the central zone and (c) about 80° C. in the lower zone; introducing aqueous ammonium thiocyanate into the uppermost portion of said upper zone; establishing said aqueous ammonium thiocyanate menstruum in the central zone; feeding carbon disulfide and ammonia into said middle zone, removing gaseous hydrogen sulfide from the upper zone; absorbing ascending gaseous ammonia into said introduced aqueous ammonium thiocyanate located in the upper zone; returning said unreacted absorbed ammonia to the central or reaction zone; evaporating accumulated liquid ammonia in said lower zone; returning the latter ammonia to the central zone; and withdrawing ammonium thiocyanate substantially free from ammonia from the lower zone.

3. A process according to claim 2 in which the aqueous ammonium thiocyanate is introduced into the uppermost section of the upper zone at a concentration of from about 20% to 50%.

4. A process according to claim 2 in which the aqueous ammonium thiocyanate is introduced into the uppermost section of the upper zone at a concentration of about 30%.

5. A process according to claim 2 in which the aqueous ammonium thiocyanate is introduced into the uppermost section of the upper zone at a temperature corresponding to the average temperature of the said zone.

6. A process according to claim 2 in which the rates of the respective feeds are so correlated as to maintain the predetermined temperature conditions in each of the said zones.

References Cited in the file of this patent

UNITED STATES PATENTS

| | | |
|---|---|---|
| 1,480,166 | Jayner | Jan. 8, 1924 |
| 2,286,273 | Hill | June 16, 1942 |

UNITED STATES PATENT OFFICE

CERTIFICATE OF CORRECTION

Patent No. 2,850,356                                  September 2, 1958

Hunt Sutherland et al.

It is hereby certified that error appears in the printed specification of the above numbered patent requiring correction and that the said Letters Patent should read as corrected below.

Column 2, line 71, for "3%" read -- 30% --.

Signed and sealed this 13th day of January 1959.

(SEAL)
Attest:

KARL H. AXLINE
Attesting Officer

ROBERT C. WATSON
Commissioner of Patents